United States Patent [19]

Dykes et al.

[11] 4,005,226
[45] Jan. 25, 1977

[54] MULTIPLE NOZZLE DISPENSER HEAD

[75] Inventors: Dewey B. Dykes, Birmingham; E. Michael Powers, Mountain Brook; T. Kenneth Foster, Birmingham; Robert E. Rogers, Mountain Brook, all of Ala.

[73] Assignee: The Jim Dandy Company, Birmingham, Ala.

[22] Filed: June 9, 1975

[21] Appl. No.: 585,400

[52] U.S. Cl. .............................. 426/281; 426/641; 426/332
[51] Int. Cl.² .......................................... A23B 1/16
[58] Field of Search ......... 239/565, 566, 558, 478, 239/565, 271, 288, 276; 222/402.24, 485, 525; 141/236, 244; 111/7.1–7.4; 99/532, 533

[56] References Cited
UNITED STATES PATENTS

| | | | |
|---|---|---|---|
| 2,018,003 | 10/1935 | Axtell | 111/7.1 |
| 2,656,785 | 10/1953 | Gannon et al. | 99/532 |
| 2,796,017 | 6/1957 | Schmidt | 99/533 |
| 2,821,944 | 2/1958 | Blake | 239/271 X |
| 3,080,809 | 3/1963 | Harris et al. | 99/532 X |
| 3,289,418 | 12/1966 | Edgerton | 239/271 X |
| 3,410,457 | 11/1968 | Brown | 99/532 X |
| 3,504,862 | 4/1970 | Lowry | 239/565 |
| 3,762,307 | 10/1973 | Badovinac | 99/532 |

*Primary Examiner*—Allen N. Knowles
*Assistant Examiner*—Norman L. Stack, Jr.

[57] ABSTRACT

A dispenser head having a plurality of prong-like nozzles is useful for impregnating meat with tenderizing and flavoring liquids, and similar purposes. It may be fitted to a conventional pressurized dispenser of the type having a tubular stem. Preferably constructed in two parts, the lower or manifold part has a bottom inlet; the upper or outlet part has a number of prong-like nozzles on parallel axes; and interfitting portions provide sealed passages to distribute the dispensed liquid to the nozzles.

2 Claims, 8 Drawing Figures

MULTIPLE NOZZLE DISPENSER HEAD

BACKGROUND OF THE INVENTION

Dispensing heads have been used on a variety of pressurized containers, one conventional type including a collapsible bag in which soft pasty substances or liquids may be contained. Gas pressure within the dispenser around and beneath the bag squeezes it when a dispensing valve is opened to force the contained substance out through a dispensing nozzle.

Liquids containing tenderizing and flavoring for meat are conventionally applied to the surface of the meat; but would be much more effective if applied below the surface of the meat.

Applicants are not aware of any prior dispenser head which employed multiple nozzles, nor which was suited for impregnating meat.

SUMMARY OF THE INVENTION

A principal object of the present invention is to provide a dispensing head having a plurality of nozzles so spaced and shaped as to permit them to be pressed through the surface of a piece of uncooked meat, and utilized to inject and impregnate the meat with tenderizing or flavoring liquids under pressure.

A further object is to provide a dispensing head having a plurality of nozzles, utilizing a minimum number of parts which are readily assembled and by assembly are sealed against leakage of the substances to be dispensed. Further purposes will appear from the speficiation which follows.

Briefly summarizing, the present dispenser head is adapted to be fitted on the outward projecting tubular stem of a conventional pressure dispenser valve used on a conventional dispenser can. It is manufactured in two parts: a manifold part whose central bottom inlet fits on the tubular stem of the valve, and an outlet part having along its upper surface a plurality of prong-like nozzles.

Passages, to distribute the substance to be dispensed from the bottom inlet to the nozzles, are provided between the two parts, and also sealing means which prevent the leakage of the substance to be dispensed. In the preferred embodiment lower parts of the passages are provided by radial grooves molded in the manifold part. On the under side of the outlet part, channel walls project downward to fit within these radial grooves. Continuous mating undercuts of these portions seal the manifold grooves. Similar sealing provisions may be provided around the outer edge of the dispensing head.

DESCRIPTION OF THE PREFERRED EMBODIMENTS

Figure 2:
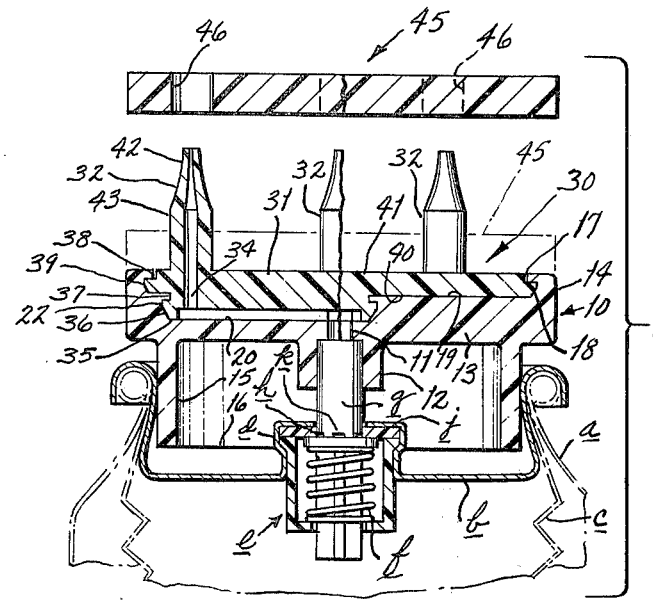
FIG. 2 is a sectional view thereof as seen along line 2—2 of FIG. 1. A spacer disk is shown positioned above the dispensing head; the phantom lines show such disk applied onto the dispensing head.

The present invention may be best understood from the sectional views. FIG. 2 shows the upper part of a conventional pressure dispenser can $a$ closed by a mounting cup $b$. Crimped between them is the upper edge of a collapsible bag $c$ to be filled with the substance to be dispensed before the parts are assembled.

In a central dome $d$ of the mounting cup $b$ is mounted a conventional dispenser valve assembly $e$ of the bottom inlet type, including a compression closing spring $f$ and having a tubular outlet stem $g$. When its valve head $h$ is pressed downward from its sealing washer $j$, the substance in the bag $c$ is squeezed by gas pressure through ports $k$ into the outlet stem $g$. Pressure about the bag $c$ is provided in a conventional manner, for example by gas inserted through a valve (not shown) in the bottom of the can $a$.

The dispensing head of FIGS. 1–4 consists of two molded plastic parts, a lower or manifold part generally designated 10 and an upper or outlet part generally designated 30, preferably force-fitted and sealed together by the provisions hereafter described.

Figure 1:
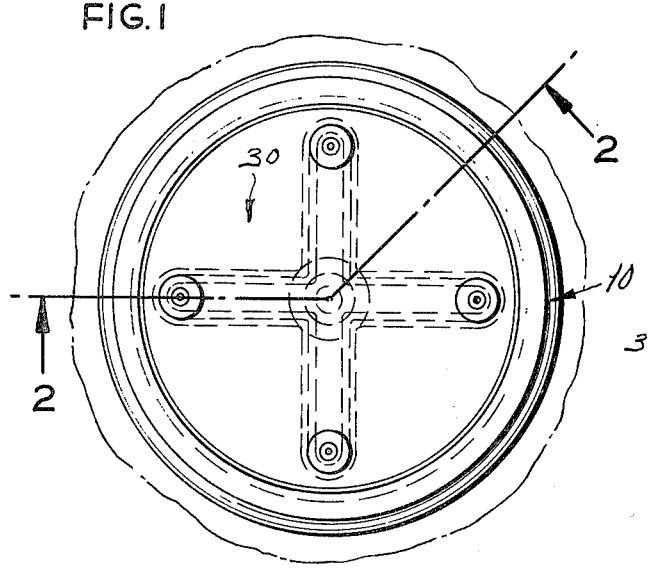
FIG. 1 is a top plan view of a dispensing head embodying the present invention, mounted on a metal dispensing can shown in phantom lines. In this embodiment, four dispensing nozzles are mounted near the edge of a circular dispensing head.

The manifold part 10 is circular in plan form as shown in FIG. 1. It is preferably molded of a somewhat resilient plastic material, to facilitate the formation of the undercuts shown and described, and by its somewhat resilient surface to provide for easy assembly with and sealing against the mating portions of the outlet part 30.

As best seen in FIG. 2 the manifold part 10 has a bottom inlet 11 surrounded by a mounting flange 12 which fits on the tubular stem $g$ of the valve assembly $e$. Above the flange 12 is a circular body portion 13 terminating in outer edge 14 which extends over the rim of the mounting cup $b$. Projecting downward into the mounting cup $b$ from the body portion 13, inwardly of its outer edge 14, is a hollow cylindrical spacing cuff 15 which serves as a guide when the dispenser head is depressed, against the resistance of the spring $f$, to open the valve $e$. The cuff lower edge 16 serves as a stop when it contacts the upper mounting cup surface $b$.

Figure 4:
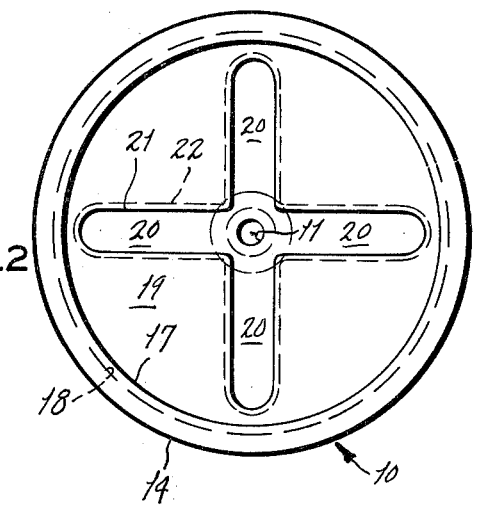
FIG. 4 is a view from above of the under or manifold part of the dispenser head of FIG. 2.

Referring to FIG. 4, which is a plan view of manifold part 10, and comparing it with FIG. 2, inwardly of the outer edge 14 is an inner rim 17 molded with an undercut 18, at the base of which is a planar upper surface portion 19. In it are formed a plurality of radial grooves 20 which extend outward from the center axis, communicating from the bottom inlet 11. The groove edges 21 which intersect the upper surface portion 19 are continuous and provide a cruciform pattern as shown in FIG. 4. Beneath them is a continuous undercut 22. It is to be understood that, for clarity of illustration, the drawings exaggerate the size of the undercuts 18, 22 and the portions which fit within them.

Figure 3:
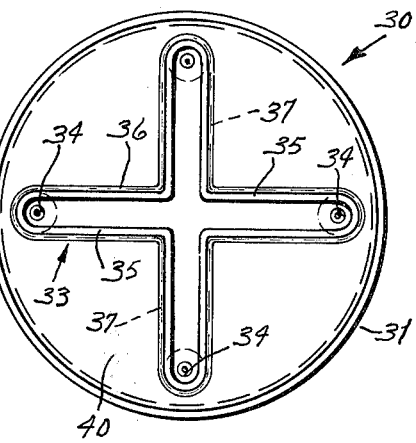
FIG. 3 is a view of the under side of the upper or outlet part of FIG. 2.

The outlet part 30 is preferably molded of a relatively rigid plastic material and its configuration can be best understood by comparing the sectional view FIG. 2 with the bottom view FIG. 3. It has a substantially disk-like body 31 with four hollow prong-like nozzles 32 molded integrally, arising from flow passages defined in part by channel-like wall portions, generally designated 33, which project downwardly in a cruciform pattern best seen in FIG. 3. The wall portions 33 provide a continuous boundary leading outward from center to surround each of the nozzle inlets 34. Considered in cross-section, the wall portions 33 have flat bottom edges 35 and side surfaces 36 which taper broadeningly upward to a continuous undercut 37 seen at the left of FIG. 2, immediately beneath the body lower surface 40.

The disk-like body 31 has an outer edge 38 stepped downwardly and outwardly from its planar upper surface 41. The outer edge 38 has a downward-and-inward tapered margin 39 leading to a lower surface 40.

The prong-like nozzles 32 have pointingly tapered upper ends 42 and cylindrical lower portions 43 arising from the upper surface 41. Over the nozzles 32 may be applied a spacer disk generally designated 45 whose thickness does not exceed the height of the substantially cylindrical wall portions 43. The spacer disk 45 has four bores 46 spaced in registration with the axes of the nozzles 32; when applied over them it fits as shown in phantom lines in FIG. 2.

The manifold part 10 and the outlet part 30 may be readily assembled by force-fitting, first positioning the outlet part 30 so that its downward projecting channel-like wall portions 33 are in registration with the radial grooves 20 of the manifold part 10. The manifold part 30 being formed of a more resilient plastic material, its groove edges 20 will flex to permit entry of the channel-like wall portions 33 and likewise its rim 17 will flex to permit entry of the stepped outer edge 38 of the outlet part 30. Sizing of the mating undercuts shown to effect sealed assembly is within the scope of knowledge of the ordinary designer.

Figure 5:
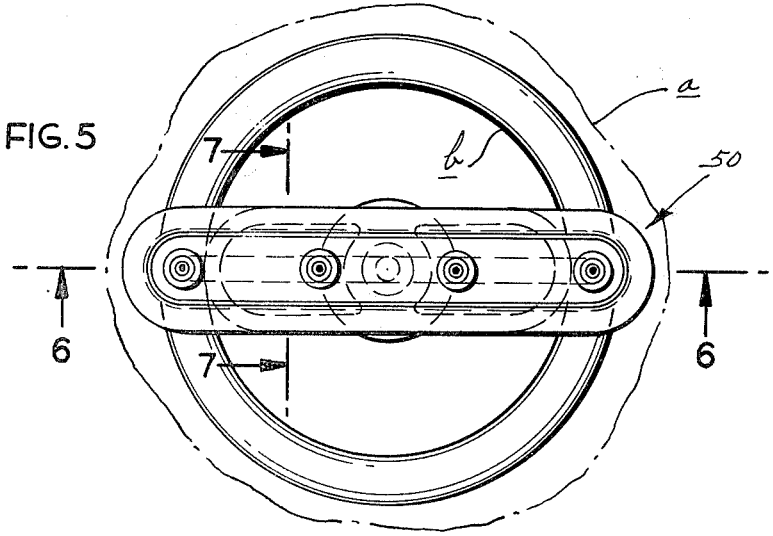
FIG. 5 is a plan view of an alternate embodiment in which four dispensing nozzles are arranged in a linear pattern on a bar-like dispensing head.
Figure 6:
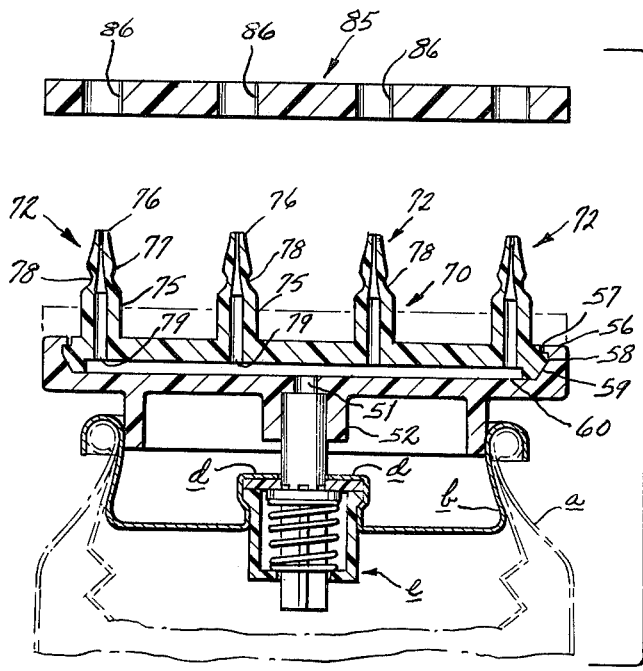
FIG. 6 is a sectional view of the dispensing head of FIG. 5 taken along line 6—6 of FIG. 5, with a spacer of corresponding shape shown thereabove. The phantom lines show said spacer in applied position.
Figure 7:
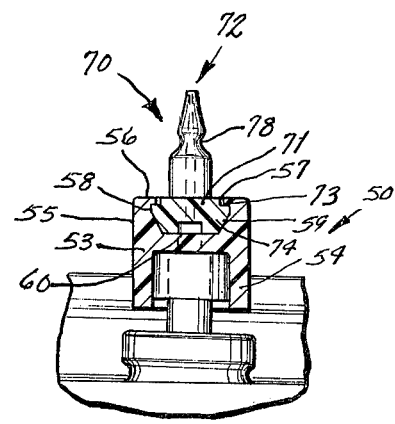
FIG. 7 is a sectional view taken along line 7—7 of FIG. 5.

In the alternate embodiment FIGS. 5, 6 and 7, four nozzles are located in linear alignment. As seen in the plan view FIG. 5, a similar can *a* mounting cup *b* are employed, using a similar collapsible bag *c* and dispensing valve assembly *e*. For this embodiment, the manifold part generally designated 50 is shaped like an elongated bar; its bottom inlet 51 is surrounded by a mounting flange 52 and its body portion 53 has a short skirt 54. When pressed down, movement will be stopped by abutment against the upper surface of the mounting cup dome *d*.

Spacedly inward of its side surfaces 55 and extending downward from its upper edge 56 is an inner rim 57 having a continuous undercut 58 from which tapering groove walls 59 lead to a bottom groove surface 60. Compared to the previously described embodiment, portions 57, 58, 59, 60 define two radial grooves extending from the central inlet 51 at 180°.

Fitted within the groove portions so formed is an outlet part generally designated 70 having a body 71 with four aligned, integrally formed upward projecting nozzles each generally designated 72. The outer edge of the body 71 has a continuous shoulder 73, below which it tapers inwardly to downward-presented channel-like wall portions 74 whose lower surfaces fit against the bottom groove surface 60. The channel-like wall portions 74 continue around the ends of the body 71 to provide a continuous boundary, corresponding to the channel portions of the prior embodiment as shown in FIG. 4. On assembly, the sloping wall portions 74 spread the inner rim 57 of the manifold part 50 until its undercut 58 fits sealedly onto the shoulder 73 as shown in FIGS. 6 and 7.

The nozzles 72 have cylindrical lower portions 75 similar to those of the prior embodiment, so that a bar-like flat spacer generally designated 85 having registering bores 86 may fit thereover as shown in the phantom lines in FIG. 6. The upper portions of the nozzles 72 taper from hollow prong-like tips 76 to shoulders 77 beneath which are annular waist portions 78. Slender bores through the nozzles 72 have lower inlets 79 between the channel-like wall portions 74.

As with the prior embodiment, the manifold part 50 is preferably formed of a more resilient plastic material than the outlet part 70, so that they may be sealedly assembled by force-fitting into the alignment shown in the cross-sectional views FIGS. 6 and 7.

Figure 8:
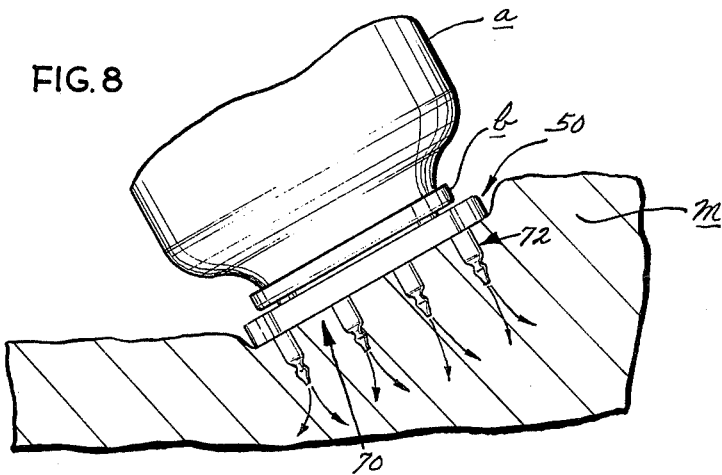
FIG. 8 is a schematic view showing the dispensing head of FIGS. 5, 6 and 7 with its nozzles pressed into a piece of meat, actuating the dispensing valve to inject tenderizing or flavoring liquid therein.

FIG. 8 shows how a dispenser head embodying the present invention is used to impregnate a mass of meat *m* with a liquid such as a tenderizing or flavoring liquid. The embodiment of invention shown in FIGS. 5 and 7 is shown. The prong-like nozzles 72 penetrate the surface of the meat *m* as the dispensing head is depressed toward the mounting cup *b*, to open the valve *e* against the resistance of its spring *f*. With the valve *e* open, the contents of the bag *c* are forced, under pressure of gas thereabout, through the nozzle 72 and injected into the mass of meat *m*, impregnating it with the tenderizing or flavoring liquid. If instead of as shown in FIG. 8 the meat was relatively thin, such as a steak or chop, the spacer 45 or 85 (depending on which dispensing head was used) would be fitted over the nozzles 32, 72, to lessen the depth to which the nozzles penetrate the meat.

Since the mass of meat *m* is somewhat resilient, as the nozzles are inserted it will tend to resist penetration and elastically press against the surfaces of nozzles. This elasticity of itself reduces the loss of injected liquid around the nozzles. If prong-like nozzles 72 are used, the resilient meat mass will draw itself into the annular waist portions 78, further lessening the loss of liquid.

However, by using the flat upper surfaces of the outlet parts 37 (or of the spacers 45, 85 if fitted thereon) and using the method hereinafter described, the apertures in the surface of the meat created by insertion of the nozzles 32, 72 are effectively sealed completely; if an excess of liquid is injected, it may so penetrate the meat as to escape through its opposite surface, rather than escape around the nozzles.

In the present method, the user grasps the can *a*, not the dispensing head. Holding the can inverted the user presses the dispensing head nozzles 32, 72 into the meat until the outlet part surface 30, 70 presses against the outer surface of the meat, compressing it and spreading it firmly against the nozzle side surfaces, in effect sealing the apertures in the meat which were created by the penetration of the nozzles 32, 72. As the next step, while such compression is continued, the can *a* is pressed down further, opening the valve *e* to discharge the liquid under pressure through the nozzles, permeating the meat outwardly of each nozzle.

In the detailed design of the compression spring *f*, it is pre-compressed; and preferably it is sufficiently stiff not to permit the valve *e* to open until the nozzles 32, 72 have penetrated the meat *m* along their parallel axes for their full height (measured over the upper surfaces of the outlet parts 30, 70 or the spacers if fitted thereon).

The two embodiments illustrated and described may be readily molded and assembled. They exemplify the present invention, whose details of construction and manner of use may be varied for the purpose chosen. As one example, supplemental return springs and guides may be used. Further, the invention may be applied to other objects than meat, and may utilize other fluids than those described, or even gas-carried powder particles. If desired, the dispensing head may be applied to the tubular outlets of squeeze bottles and other types of containers. Such variations will be apparent from this disclosure to persons having ordinary skill in the art.

We claim:

1. The method of causing a liquid to permeate meat for tenderizing, flavoring and the like, comprising the steps of penetrating the surface of the meat, along a plurality of parallel axes, with parallel spaced-apart prong-like nozzles, whereby to form apertures, then, while maintaining such nozzles within such apertures, pressing a surface perpendicular to their axes against the entire outer surface of the meat between them, thereby causing the meat to spread sideward about such nozzles and hold such apertures sealed, and while so holding such apertures sealed, discharging liquid under super-atmospheric pressure through such nozzles into the meat, whereby to permeate the meat without escaping about such nozzles through such apertures.

2. As a new use for a dispenser having a valve of the spring-closed type whose outlet is a tubular stem and a dispensing head mounted thereon having a plurality of prong-like outlet nozzles on parallel axes projecting perpendicularly from a planar surface extending over the entire area between such nozzles, such dispenser containing liquid for flavoring or tenderizing meat and gas under super-atmospheric pressure to dispense such liquid when the head is displaced, the process of permeating meat with such liquid, comprising the steps of inverting the dispenser, presenting its dispensing head against the meat, penetrating the surface of the meat with such prong-like nozzles, whereby to form apertures, pressing the dispenser to force such planar surface against the outer surface of the meat between such nozzles, thereby causing the meat to press sideward about such nozzles and hold such apertures substantially sealed against leakage, and so depressing said container against the resistance at the meat surface as to displace the head, thereby to open the valve and discharge liquid under such gas pressure through such nozzles into the meat, whereby, being unable to escape through such sealed apertures, to permeate the meat.

* * * * *